US008634656B2

(12) United States Patent
Yano (10) Patent No.: US 8,634,656 B2
(45) Date of Patent: Jan. 21, 2014

(54) RECOGNIZING OBJECTS BY UTILIZING DICTIONARY DATA AND PROBABILITY DATA DETERMINED BY MACHINE LEARNING

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/903,584

(22) Filed: Oct. 13, 2010

(65) Prior Publication Data

US 2011/0091116 A1 Apr. 21, 2011

(30) Foreign Application Priority Data

Oct. 19, 2009 (JP) ................................ 2009-240820

(51) Int. Cl.
G06K 9/62 (2006.01)
(52) U.S. Cl.
USPC ........................................................ 382/209
(58) Field of Classification Search
None
See application file for complete search history.

(56) References Cited

U.S. PATENT DOCUMENTS

| | | | |
|---|---|---|---|
| 6,507,358 B1 | 1/2003 | Mori et al. | |
| 7,289,141 B2 | 10/2007 | Yamada et al. | |
| 7,298,523 B2 | 11/2007 | Masumoto et al. | |
| 7,409,083 B2 | 8/2008 | Yano | |
| 7,469,072 B2 | 12/2008 | Yano | |
| 7,471,847 B2 | 12/2008 | Yano | |
| 7,502,049 B2 | 3/2009 | Aichi et al. | |
| 7,515,309 B2 | 4/2009 | Yano et al. | |
| 7,532,361 B2 | 5/2009 | Yano | |
| 7,561,288 B2 | 7/2009 | Yano et al. | |
| 7,564,487 B2 | 7/2009 | Kato et al. | |
| 7,613,338 B2 | 11/2009 | Yano | |
| 7,633,649 B2 | 12/2009 | Masumoto et al. | |
| 7,639,278 B2 | 12/2009 | Goto et al. | |
| 7,650,045 B2 | 1/2010 | Yano | |
| 2005/0004897 A1* | 1/2005 | Lipson et al. ............ 707/3 |
| 2005/0024497 A1 | 2/2005 | Sakamoto et al. | |
| 2009/0002730 A1 | 1/2009 | Yamada et al. | |
| 2009/0161161 A1 | 6/2009 | Yano et al. | |

OTHER PUBLICATIONS

Grabner and Bischof, "On-line Boosting and Vision," Proceedings of the IEEE Conference on Computer Vision and Pattern Recognition (CVPR 2006).
Viola and Jones, "Rapid Object Detection using Boosted Cascade of Simple Features," Proceedings of the IEEE Conference on Computer Vision and Pattern Recognition (CVPR 2001).

(Continued)

Primary Examiner — Nirav G Patel
(74) Attorney, Agent, or Firm — Fitzpatrick, Cella, Harper & Scinto (57) ABSTRACT

An information processing apparatus acquires registration image data related to an object and input image data related to an object, and matches the acquired registration image data related to the object and each of a plurality of object dictionary data items stored in a storage device. Based on the matching result, the information processing apparatus selects an object dictionary data item relevant to the object related to the registration image data from the plurality of object dictionary data items, and matches the acquired input image data related to the object and the selected object dictionary data item. Based on the matching result, the information processing apparatus determines the object related to the input image data. Based on the determination result, the information processing apparatus updates the selected object dictionary data item. Thus, object recognition is easily and highly accurately performed.

6 Claims, 4 Drawing Sheets

(56) References Cited

OTHER PUBLICATIONS

Rowley et al, "Neural network-based face detection," IEEE Transactions on Pattern Analysis and Machine Intelligence, vol. 20, No. 1, Jan. 1998.

Yanai, "The Current State and Future Directions on Generic Object Recognition," Transactions of Information Processing Society of Japan, vol. 48, No. SIG_16 (CVIM_19), 2007.

* cited by examiner

FIG. 3

| DICTIONARY CATEGORY NAME |
| --- |
| PROCESSING AREA SIZE |
| LIKELIHOOD THRESHOLD |
| THE NUMBER OF LOCAL AREAS |
| LOCAL AREA POSITION, FEATURE AMOUNT TYPE, LIKELIHOOD TABLE |
| ⋮ |
| LOCAL AREA POSITION, FEATURE AMOUNT TYPE, LIKELIHOOD TABLE |

FIG. 4

RECOGNIZING OBJECTS BY UTILIZING DICTIONARY DATA AND PROBABILITY DATA DETERMINED BY MACHINE LEARNING

BACKGROUND OF THE INVENTION

1. Field of the Invention

The present invention relates to an object recognition apparatus and an object recognition method.

2. Description of the Related Art

Functions for detecting a human face from an image being shot and for tracking the subject of shooting (the object) in a digital still camera or a camcorder have been known. Such a face detection function and a face tracking function are very useful for automatically adjusting the focus and exposure to an object being shot.

Object tracking methods through online learning have been proposed in recent years. In the online learning, an image related to an object being shot is utilized to adapt a dictionary for use in recognition processing to the recognition target. An example of the methods is described in Grabner and Bischof, "On-line Boosting and Vision," Proceedings of the IEEE Conference on Computer Vision and Pattern Recognition (CVPR '06) (hereinafter abbreviated as a "Grabner document"). According to this method, tracked targets are not limited to a human face, but objects such as pet animals can be set as tracked targets. In other words, this method allows expanding trackable targets.

In this method, for example, if recognizing the entire human body is desired, a processing area to be subjected to the recognition is advantageously a tall rectangle. If recognizing a car is desired, a processing area to be subjected to the recognition is advantageously a wide rectangle. Accordingly, the above method proposed in the Grabner document expects a user to specify the area of the tracked target in advance.

Also for example, to recognize an object with high accuracy, feature amounts that characterize the recognition target object need to be configured in advance. However, the recognition accuracy will not be improved by performing the learning with feature amounts that originally provide low recognition performance. Therefore, the above method proposed in the Grabner document concurrently employs Haar-like feature, orientation histogram, and LBP (Local Binary Pattern) for feature amounts for use in the object recognition and randomly uses 250 of the feature amounts for the learning.

However, to recognize various objects with high accuracy according to the above method proposed in the Grabner document, a vast number of feature amounts for various combinations of positions and sizes of local areas in the processing area to be subjected to the object recognition need to be used in the learning. Accordingly, it is difficult with the above method in the Grabner document to balance the accuracy and the processing time associated with the object recognition.

SUMMARY OF THE INVENTION

An object of the present invention is to recognize an object more easily and accurately.

To solve the problem discussed above, the present invention provides an information processing apparatus comprising: an acquiring unit configured to acquire image data related to objects; a selecting unit configured to match first image data related to an object acquired by the acquiring unit and each of a plurality of object dictionary data items stored in a storage device and select an object dictionary data item relevant to the object related to the first image data from the plurality of object dictionary data items based on a result of the matching; a determining unit configured to match second image data related to an object acquired by the acquiring unit and the object dictionary data item selected by the selecting unit and determine the object related to the second image data based on a result of the matching; and an updating unit configured to update the object dictionary data item selected by the selecting unit according to a result of the determination of the determining unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figures 1A, 1B:
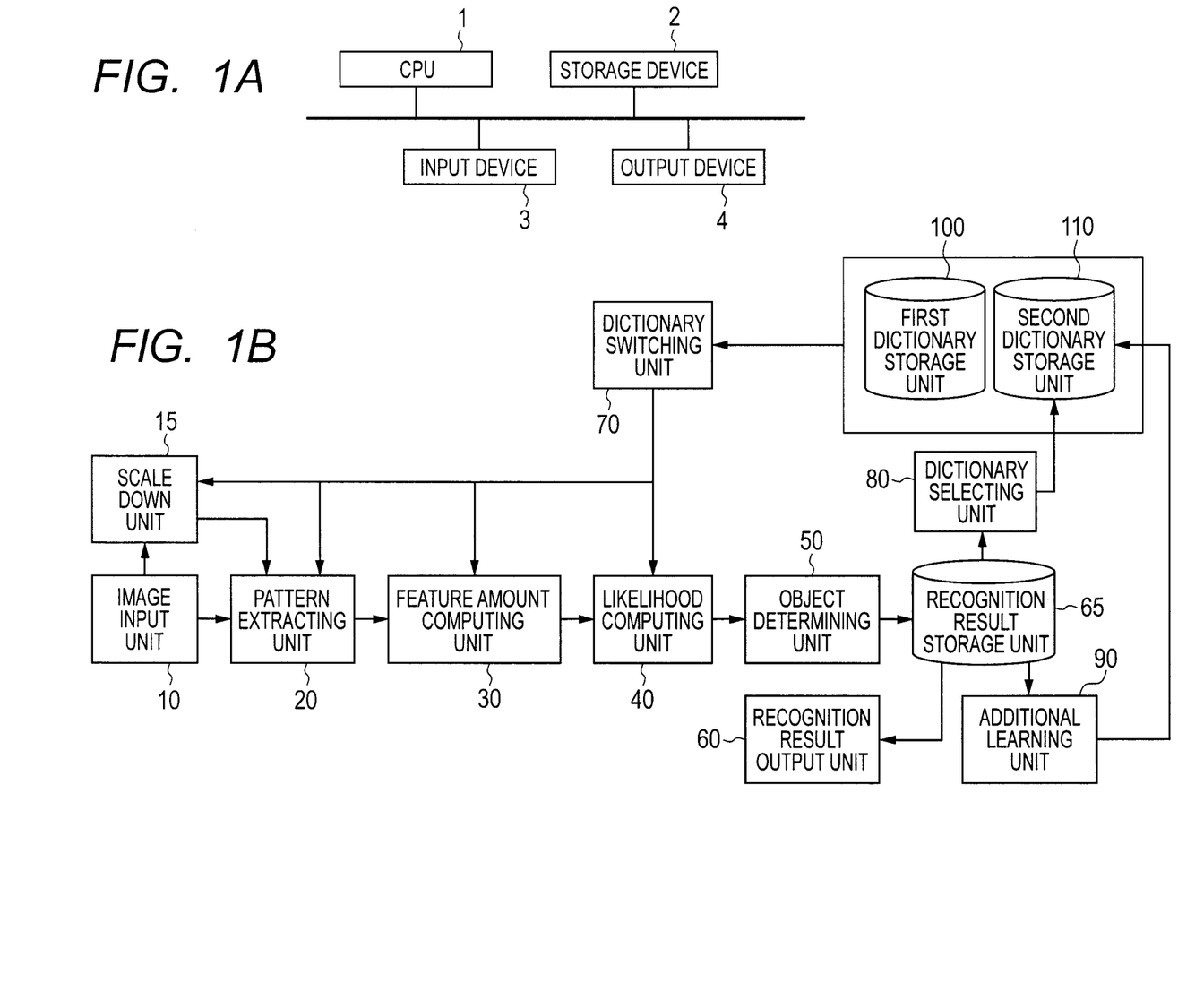
FIGS. 1A and 1B are diagrams illustrating configurations of an information processing apparatus.

An embodiment of the present invention will be described below based on the drawings. FIGS. 1A and 1B illustrate configurations of an information processing apparatus according to the embodiment. FIG. 1A is a diagram illustrating a hardware configuration of the information processing apparatus. The information processing apparatus includes a CPU (Central Processing Unit) 1, a storage device 2, an input device 3, and an output device 4. These devices are configured to be able to communicate with each other and are interconnected with a bus.

The CPU 1 controls the operation of the information processing apparatus and executes programs stored in the storage device 2. The storage device 2 may be a magnetic storage device or semiconductor memory, and stores programs read according to the operation of the CPU 1 and data that needs to be stored for a long time. In the embodiment, functions in the information processing apparatus and processing related to flowcharts to be described later are implemented by the CPU 1 performing processing according to a procedure of a program stored in the storage device 2.

The input device 3 may be a mouse, a keyboard, a touch panel device or buttons, and inputs various instructions. The output device 4 may be a liquid crystal panel or an external monitor, and outputs various sorts of information.

The hardware configuration of the information processing apparatus is not limited to the above-described configuration. For example, the information processing apparatus may include an I/O device for communication with various devices. Exemplary I/O devices are an I/O unit for a memory card or for a USB cable, and a wired or wireless transmission/reception unit. The information processing apparatus may also include an imaging device, such as a camcorder, having an image pickup device such as a CCD (Charge Coupled Device) or a CMOS (Complementary Metal Oxide Semiconductor), for example.

FIG. 1B is a diagram illustrating a functional configuration of the information processing apparatus according to the embodiment. Processing and functions of the information processing apparatus are implemented by units illustrated in FIG. 1B.

An image input unit 10 acquires image data imaged by an imaging device such as a camera.

A scale down unit 15 scales down the image data acquired by the image input unit 10.

A pattern extracting unit 20 clips out a partial image for pattern recognition from the image data acquired by the image input unit 10 and the image data scaled down by the scale down unit 15.

A feature amount computing unit 30 computes, from the partial image clipped out by the pattern extracting unit 20, feature amounts for recognizing an object related to the image data acquired by the image input unit 10.

A likelihood computing unit 40 determines a likelihood of the recognition target object from the feature amounts computed by the feature amount computing unit 30.

An object determining unit 50 determines whether or not the partial image clipped out by the pattern extracting unit 20 is an image representing the recognition target object from the likelihood determined by the likelihood computing unit 40.

A recognition result output unit 60 outputs a recognition result of the object determining unit 50. For example, the area of the partial image determined as the recognition target object by the object determining unit 50 is displayed on the output device 4 in a form distinguishable from other image areas.

A recognition result storage unit 65 is a storage area provided in the storage device 2 and stores the object likelihood determined by the likelihood computing unit 40 and related data.

A first dictionary storage unit 100 is a storage area provided in the storage device 2. The first dictionary storage unit 100 is memory that stores object dictionaries (object dictionary data) potentially corresponding to the recognition target. An object dictionary includes information such as feature amount information and likelihood information, and is obtained through machine learning from image patterns of many objects. The feature amount information includes information for computing feature amounts of the object (e.g., information representing feature amount types to be described later, and information about integral images to be described later). The likelihood information includes information for computing the likelihood of the object (e.g., information representing likelihood tables to be described later). The first dictionary storage unit 100 stores a plurality of object dictionaries corresponding to a plurality of objects, respectively.

A dictionary switching unit 70 selectively switches among the object dictionaries stored in the first dictionary storage unit 100 and supplies processing parameters to each processing unit that performs the object recognition.

A dictionary selecting unit 80 selects an object dictionary most relevant to the recognition target based on object likelihoods corresponding to a plurality of objects stored in the recognition result storage unit 65.

A second dictionary storage unit 110 is a storage area provided in the storage device 2. The second dictionary storage unit 110 is memory that stores the object dictionary selected by the dictionary selecting unit to be used in additional learning and recognition processing.

An additional learning unit 90 performs the additional learning by using object likelihoods and related data stored in the recognition result storage unit 65 from the object dictionary stored in the second dictionary storage unit 110, and updates data in the object dictionary.

Figure 2:
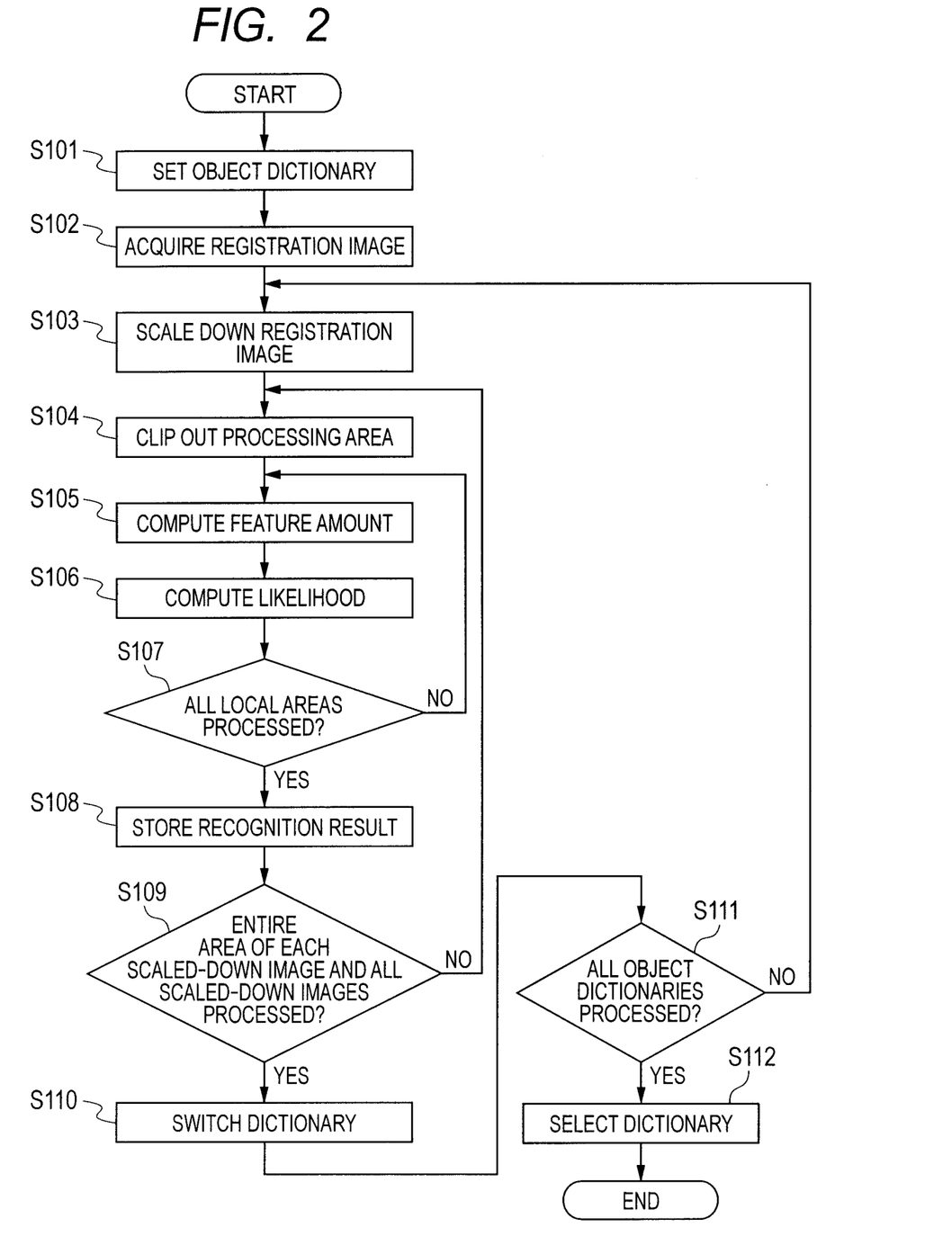
FIG. 2 is a diagram illustrating an exemplary flowchart related to processing of registering a recognition target.

Now, with reference to FIGS. 2 to 4, the operation of the information processing apparatus will be described. The embodiment assumes a situation in which an image of a dog, which is a nonhuman object (subject of shooting), is registered as a recognition target with an imaging device such as a digital still camera and tracked through online learning. N types of object dictionaries including "human face" and "dog" are stored in advance in the first dictionary storage unit 100.

First, with reference to FIG. 2, a flow of processing by the information processing apparatus in registering the recognition target will be described.

The dictionary switching unit 70 sets a first object dictionary from the object dictionaries stored in the first dictionary storage unit 100 and supplies processing parameters to each processing unit that performs the object recognition (step S101).

Figure 3:
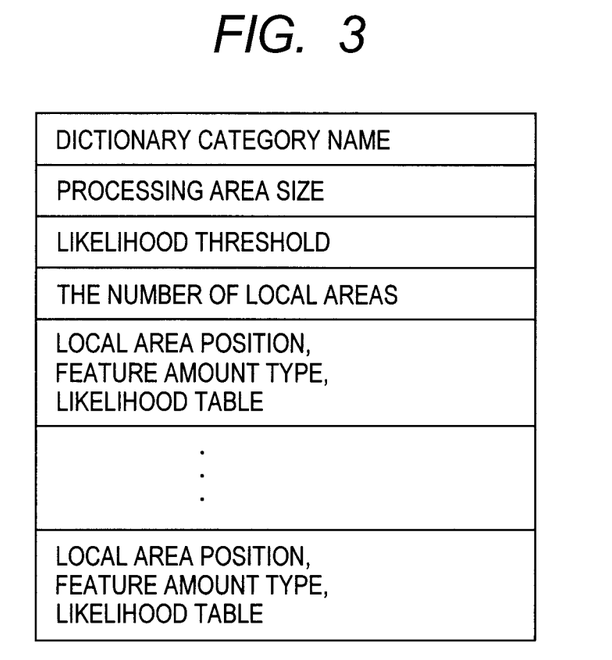
FIG. 3 is a diagram illustrating exemplary details of processing parameters in an object dictionary.
Figure 4:
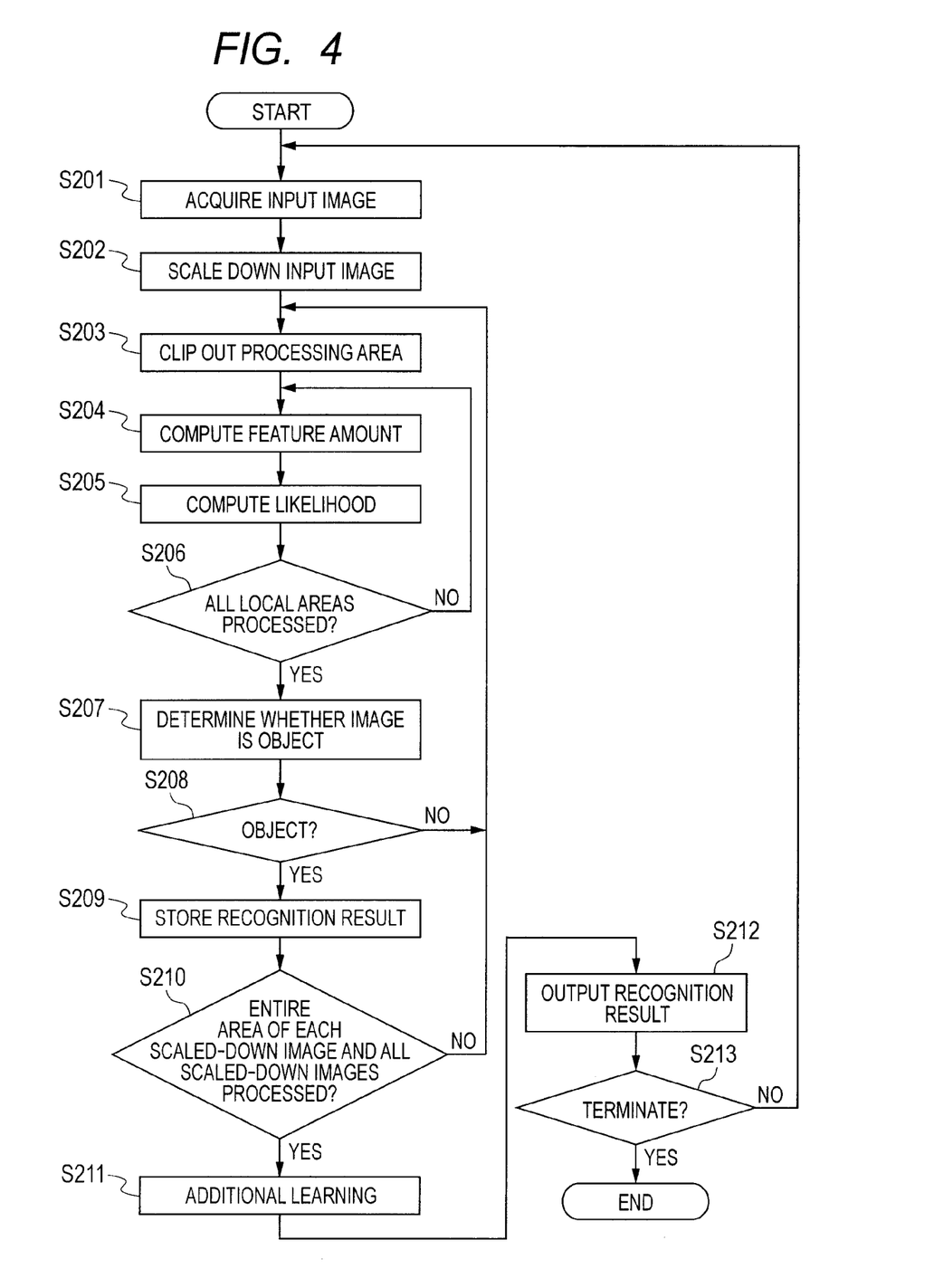
FIG. 4 is a diagram illustrating an exemplary flowchart related to recognition processing and additional learning processing.

FIG. 3 shows details of the processing parameters. The dictionary category name represents the name of the object dictionary and associates the recognition target with the object dictionary. The processing area size is the size (e.g., the height and width of a rectangular area in terms of the number of pixels) of a processing area to be extracted from an image in order to perform image pattern matching. The likelihood threshold is a threshold used in determining whether or not an image pattern in the processing area is the recognition target. The number of local areas is the number of areas (what are called local areas) provided in the processing area to be subjected to the image pattern matching. The embodiment assumes a processing scheme of recognizing an object based on feature amounts in a plurality of local areas.

The processing parameters also include, for each local area, information about the local area position, the feature amount type, and likelihood tables. The local area position is information indicating the position of a local area in the processing area to be subjected to the image pattern matching. Since the embodiment assumes rectangular local areas, the local area position can be expressed as the ordinate and abscissa at the upper-left corner and the ordinate and abscissa at the lower-right corner of the local area in the processing area. The feature amount type is the type of a feature amount, which is either one of Haar-like feature and orientation histogram in the embodiment and identified by an identifier. The likelihood tables are tables in which a probability distribution of the feature amounts for image patterns of the recognition target and a probability distribution of the feature amounts for image patterns of non recognition targets in the local area are stored as tables. The likelihood tables are obtained in advance through machine learning.

In this step, the dictionary switching unit 70 supplies the processing area size to the scale down unit 15 and the pattern extracting unit 20. The embodiment assumes that an object dictionary of "human face" is selected as the first object dictionary.

The image input unit 10 serving as an example of an acquiring unit acquires a registration image (first image data) (step S102). Here, the user uses an imaging device (not shown) to shoot a recognition target object.

While looking at a display screen on a display device (not shown) provided on the imaging device, the user shoots the image with the screen filled with the recognition target object. For example, as the registration image, the image input unit 10 acquires an image of a "dog" that is the recognition target.

The image data shot at this point is two-dimensional array data formed of 8-bit pixels, which is RGB data formed of three aspects of R, G and B, for example. The image input unit 10 converts the RGB data into luminance data and stores the luminance data in image memory (not shown) provided in the storage device 2. The embodiment assumes that the luminance data is applied to subsequent processing. If YUV data is employed as the image data, the image input unit 10 may directly use the Y component as the luminance data.

The scale down unit 15 scales down the image data acquired by the image input unit 10 (step S103). Here, the scale down unit 15 determines a predetermined range of scale down factors based on the size of the image data acquired by the image input unit 10 and the processing area size stored in the first dictionary storage unit 100. For example, if the size of the image data is 640×480 pixels and the processing area size in the object dictionary is 20×20 pixels, the scale down unit 15 scales down the image data by factors of 0.06, 0.05 and 0.04 so that the scaled-down image size equals the processing area size. This is for clipping out an appropriate size of processing area to be subjected to the recognition on the assumption that the recognition target object has been shot with the screen filled with the recognition target object in the registration image acquiring step S102. The scale down unit 15 stores the scaled-down image data in the image memory provided in the storage device 2.

From the image data scaled down in step S103, the pattern extracting unit 20 clips out a partial image that is the processing area to be subjected to the image recognition (step S104). The pattern extracting unit 20 clips out the partial image according to the processing area size stored in the first dictionary storage unit 100.

From the partial image clipped out by the pattern extracting unit 20, the feature amount computing unit 30 computes feature amounts for recognizing the object related to the image data acquired by the image input unit 10 (step S105).

First, the feature amount computing unit 30 acquires, via the dictionary switching unit 70, a local area position and a feature amount type for the processing area stored in the first dictionary storage unit 100.

The feature amount computing unit 30 then computes a feature amount in a local area corresponding to the acquired local area position (the ordinates and abscissas at the upper-left and lower-right corners of the local area) according to the acquired feature amount type from the partial image clipped-out by the pattern extracting unit 20. For example, if the feature amount type is Haar-like feature and if a feature amount such that the upper half is lighter and the lower half is darker is to be computed, the feature amount computing unit 30 computes a Haar-like feature such that the upper half of the local area is lighter and the lower half of the local area is darker.

The embodiment employs a configuration in which a feature amount such as of Haar-like feature or orientation histogram is directly computed from the image data. However, this is not limiting. For example, an integral image may be computed in advance to compute a feature amount from the integral image (for example, see Viola and Jones, "Rapid Object Detection using Boosted Cascade of Simple Features," Proceedings of the IEEE Conference on Computer Vision and Pattern Recognition (CVPR '01)).

The likelihood computing unit 40 uses the object dictionary stored in advance in the first dictionary storage unit 100 to determine the likelihood of the recognition target object from the feature amount computed by the feature amount computing unit 30 (step S106).

First, the likelihood computing unit 40 acquires, via the dictionary switching unit 70, likelihood tables stored in the first dictionary storage unit 100 corresponding to the feature amount computed by the feature amount computing unit 30.

Based on the feature amount computed by the feature amount computing unit 30, the likelihood computing unit 40 determines the likelihood of the recognition target from a table representing the probability distribution of the feature amount for image patterns of the recognition target as likelihoods. Also based on the feature amount computed by the feature amount computing unit 30, the likelihood computing unit 40 determines the likelihood of a non recognition target from a table representing the probability distribution of the feature amount for image patterns of non recognition targets as likelihoods.

From the likelihood of the recognition target and the likelihood of a non recognition target, the likelihood computing unit 40 determines the likelihood of the object for the partial image.

Now, the likelihood will be described below. In generating an object dictionary in advance through machine learning, a plurality of sample patterns of the recognition target object and a plurality of other sample patterns (e.g., human faces and non human faces) are provided. Desirably, 10,000 patterns or more are provided for each type.

A feature amount fk is computed from each image pattern through processing similar to the processing performed by the feature amount computing unit 30. A probability distribution $Pr(f_k|I+)$ of the feature amounts fk of all the image patterns of the recognition target object, and a probability distribution $Pr(f_k|I-)$ of the feature amounts fk of all the image patterns of the non recognition targets are determined. A likelihood Ck that an image pattern with a feature amount fk value is the recognition target object is determined by (Equation 1) below.

$$C_k = \log[\{Pr(f_k \mid I_+)\} \div \{Pr(f_k \mid I_-)\}] \quad \text{(Equation 1)}$$
$$= C_{k+}(f_k) - C_{k-}(f_k)$$
$$\text{where } C_{k+}(f_k) = \log\{Pr(f_k \mid I_+)\} \text{ and}$$
$$C_{k-}(f_k) = \log\{Pr(f_k \mid I_-)\}$$

Therefore, in the embodiment, as the table representing the probability distribution for image patterns of the recognition target as likelihoods, a likelihood table is configured so that the value $C_{k+}(f_k)$ in the above (Equation 1) can be referred to. Further, as the table representing the probability distribution for image patterns of the non recognition targets as likelihoods, a likelihood table is configured so that the value $C_{k-}(f_k)$ in the above (Equation 1) can be referred to. By configuring the likelihood tables in this manner, the likelihood computing unit 40 can determine the likelihoods of the object for the partial image according to the above (Equation 1).

The likelihood computing unit 40 determines whether or not the processing of determining the likelihood has been performed for all the local areas (step S107). If it is determined that the processing of determining the likelihood has been performed for all the local areas, the likelihood computing unit 40 moves the process to step S108. If it is determined that the processing of determining the likelihood has not been performed for all the local areas, the likelihood computing unit 40 moves the process to step S105.

Thus, the processing in steps S105 and S106 are repeated according to the number of local areas stored in the first dictionary storage unit 100. Here, the feature amount computing unit 30 performs the processing by acquiring, via the dictionary switching unit 70, the processing parameters of the local area position and the feature amount type stored in the first dictionary storage unit 100. The likelihood computing unit 40 performs the processing by acquiring the likelihood tables via the dictionary switching unit 70. The likelihood computing unit 40 determines the likelihood for each of the feature amounts in the local areas and sets the total of the likelihoods as the ultimate likelihood of the recognition target object. Therefore, the ultimate likelihood C of the recognition target object can be determined by the (Equation 2) below.

$$C = \sum_k C_{k+}(f_k) - \sum_k C_{k-}(f_k) \quad \text{(Equation 2)}$$

In this manner, the information processing apparatus can recognize the object more accurately by combining a plurality of feature amounts.

Once the same number of likelihoods as the number of local areas have been computed for the clipped-out partial image, the recognition result storage unit 65 stores the likelihood C along with the dictionary category name (step S108).

The recognition result storage unit 65 then determines whether or not the entire area of each scaled-down image and all the scaled-down images have been processed (step S109).

If the entire area of each scaled-down image and all the scaled-down images have been processed, the recognition result storage unit 65 moves the process to step S110. If the entire area of each scaled-down image and all the scaled-down images have not been processed, the recognition result storage unit 65 moves the process to step S104.

That is, the information processing apparatus repeats the above-described processing in steps S104 to S108 by horizontally and vertically scanning the positions for clipping out image patterns to be matched from the image across the entire area of the scaled-down image one after another. The information processing apparatus further repeats the above-described processing in steps S104 to S108 sequentially for each scaled-down image scaled down in step S103. In the embodiment, the information processing apparatus performs this processing for the scaled-down images in which the recognition target object is assumed to have been shot with the screen filled with the recognition target object. Therefore, the number of repetitions can be relatively small.

The dictionary switching unit 70 selects a next object dictionary (e.g., an object dictionary of "dog") from the object dictionaries stored in the first dictionary storage unit 100 and supplies the processing parameters to each processing unit that performs the object recognition (step S110).

The dictionary switching unit 70 determines whether or not the processing in steps S103 to S110 has been performed for all the object dictionaries stored in the first dictionary storage unit 100 (step S111). If it is determined that the processing has been performed for all the object dictionaries stored in the first dictionary storage unit 100, the dictionary switching unit 70 moves the process to step S112. If it is determined that the processing has not been performed for all the object dictionaries stored in the first dictionary storage unit 100, the dictionary switching unit 70 moves the process to step S103. That is, the information processing apparatus performs the processing in steps S103 to S110 for the selected object dictionaries. According to the processing flow, the dictionary switching unit 70 supplies the processing parameter of the processing area size to the scale down unit 15 and the pattern extracting unit 20, supplies the processing parameters of the local area position and the feature amount type to the feature amount computing unit 30, and supplies the likelihood tables to the likelihood computing unit 40.

That is, the processing in steps S103 to S110 is repeated for each object dictionary. In other words, the recognition processing is performed with different processing area sizes, numbers of local areas, and feature amount types depending on the recognition target object.

If the processing has been performed for all the object dictionaries stored in the first dictionary storage unit 100, the dictionary selecting unit 80 selects the optimal object dictionary based on the recognition results of the registration image for the object stored in the recognition result storage unit 65 (step S112). For example, the dictionary selecting unit 80 extracts the highest one of the likelihoods that are the recognition results stored in the recognition result storage unit 65 and extracts a dictionary category name corresponding to the highest likelihood. The dictionary selecting unit 80 selects an object dictionary corresponding to the extracted dictionary category name and stores the processing parameters in the second dictionary storage unit 110. The embodiment assumes the case in which the image of a "dog" has been acquired by the image input unit 10 in the registration, so that the dictionary of "dog" is resultantly selected from the object dictionaries.

In this manner, units such as the feature amount computing unit 30, the likelihood computing unit 40, and the dictionary selecting unit 80 serving as examples of a selecting unit match the registration image with each of the object dictionaries. Based on the results of the matching, an object dictionary highly relevant to the object related to the registration image is selected.

Next, with reference to FIG. 4, a flow of processing by the information processing apparatus in recognizing an object will be described. This processing follows the above-described registration processing. That is, the recognition processing and the additional learning processing for the object dictionary are performed for the registration image initially acquired in step S102. Although the description below assumes the recognition processing following the registration, once the registration is finished, the recognition processing and the additional learning processing for the object dictionary may also be performed in the same manner at a different shooting scene.

The image input unit 10 serving as an example of the acquiring unit acquires an input image (second image data) (step S201). In the embodiment, as described above, the image input unit 10 initially acquires the registration image as an input image. That is, the first image data and the second image data may be the same or different.

The scale down unit 15 scales down the image data of the input image acquired by the image input unit 10 (step S202). In this processing, unlike in the registration processing, it is not assumed that the recognition target object has been shot with the screen filled with the recognition target object. Therefore, the scale down unit 15 sequentially scales down the input image by a predetermined factor in order to address detection of various sizes of objects.

For example, the scale down unit 15 sequentially scales down the image data by a factor of 0.8 from the maximum size of 640×480 pixels. That is, the scale down unit 15 takes the 640×480 pixel image data as an input to generate scaled-down 512×384 pixel image data, and takes the generated 512×384 pixel image data as an input to generate scaled-down 410×307 pixel image data. In this manner, the scale down unit 15 repeats the scale down processing.

Here, the minimum image size is almost equal to the appropriate size in the case where it is assumed that the recognition target object has been shot with the screen filled with the recognition target object. Therefore, the scale down unit 15 acquires, via the dictionary switching unit 70, the processing area size stored in the second dictionary storage unit 110, and sets the minimum image size based on the acquired processing area size. The scale down unit 15 stores the scaled-down image data in the image memory provided in the storage device 2.

The pattern extracting unit 20 clips out a partial image that is a processing area to be subjected to the object recognition from the image data scaled down in step S202 in a manner similar to the processing in step S104 in the registration processing (step S203). The processing area size of the processing area clipped out at this point has been selected in the registration processing and stored in the second dictionary storage unit 110, and is therefore appropriate for the recognition target. For the partial image clipped out at this point, the object determining unit 50 determines in the recognition processing to be described later whether or not the image pattern of the partial image is the recognition target object.

From the partial image clipped out by the pattern extracting unit 20, the feature amount computing unit 30 computes a feature amount for recognizing the object related to the image data acquired by the image input unit 10 (step S204). The feature amount is computed in a manner similar to the processing in step S105 in the registration processing. It is noted that the feature amount computing unit 30 refers to the processing parameters stored in the second dictionary storage unit 110 for the local area position and the feature amount type in the processing area. The feature amount of the local area computed at this point is based on the local area position and the feature amount type of the object dictionary selected and stored in the second dictionary storage unit 110 in the registration processing, and is therefore appropriate for the recognition target.

The likelihood computing unit 40 uses the object dictionary stored in advance in the second dictionary storage unit 110 to determine the likelihood of the recognition target object from the feature amount computed by the feature amount computing unit 30 as in the processing in step S106 in the registration processing (step S205).

The likelihood computing unit 40 determines whether or not the processing of determining the likelihood has been performed for all the local areas (step S206). If it is determined that the processing of determining the likelihood has been performed for all the local areas, the likelihood computing unit 40 moves the process to step S207. If it is determined that the processing of determining the likelihood has not been performed for all the local areas, the likelihood computing unit 40 moves the process to step S204. The likelihood computing unit 40 determines the ultimate likelihood C of the recognition target object by the above (Equation 2).

In this manner, the information processing apparatus repeats the processing in steps S204 and S205 according to the number of local areas stored in the second dictionary storage unit 110 and combines the feature amounts, thereby allowing more accurate object recognition.

Then, in order to determine whether or not the partial image clipped out by the pattern extracting unit 20 is the recognition target object from the likelihood of the object determined by the likelihood computing unit 40, the object determining unit 50 acquires the likelihood C computed in step S205 (step S207).

The object determining unit 50 determines whether or not the image pattern of the partial image being matched is the recognition target object (step S208). If the likelihood C acquired in step S207 is greater than a predetermined threshold T, the object determining unit 50 determines that the image pattern of the partial image being matched is the recognition target object and moves the process to step S209. If the likelihood C is not greater than the predetermined threshold T, the object determining unit 50 determines that the image pattern of the partial image being matched is not the recognition target object and moves the process to step S203. The threshold T, which is the likelihood threshold stored in advance in the second dictionary storage unit 110, is referred to via the dictionary switching unit 70.

In this manner, units such as the feature amount computing unit 30, the likelihood computing unit 40, and the object determining unit 50 serving as examples of a determining unit match the input image with the already selected object dictionary highly relevant to the object related to the registration image. Based on the result of the matching, the determining unit determines whether or not the object related to the input image is the object related to the registration image.

If it is determined that the image pattern in the processing area is the recognition target object in step S208, the recognition result storage unit 65 stores the recognition result (step S209). The stored result includes the feature amount for each local area for use in updating the likelihood tables in the additional learning processing to be described later, and the positional coordinates of the processing area for use in the output of the recognition result to be described later.

The recognition result stored in the recognition result storage unit 65 for use in the additional learning to be described later may not be the feature amounts themselves but any data with which the likelihood tables can be updated. For example, the data may be indices for referring to the likelihood tables from the feature amounts.

If it is determined that the image pattern in the processing area is not the recognition target object in step S208, the processing in step S209 is skipped.

The recognition result storage unit 65 then determines whether or not the processing has been performed for the entire area of each scaled-down image and for all the scaled-down images (step S210).

If the processing has been performed for the entire area of each scaled-down image and for all the scaled-down images, the recognition result storage unit 65 moves the process to step S211. If the processing has not been performed for the entire area of each scaled-down image and for all the scaled-down images, the recognition result storage unit 65 moves the process to step S203.

That is, the image processing apparatus repeats the above-described processing in steps S203 to S209 by horizontally and vertically scanning the positions for clipping out the image patterns to be matched from the image across the entire area of the scaled-down image one by one. The image processing apparatus further repeats the processing in steps S203 to S209 sequentially for each scaled-down image generated in step S202.

Then, the additional learning unit 90 serving as an example of an updating unit performs the additional learning processing in order to update the object dictionary stored in the second dictionary storage unit 110 if the recognition results are stored in the recognition result storage unit 65 in step S209 (step S211).

For example, for the object dictionary of "dog" selected based on the image of a "dog" in the registration, the additional learning is performed by using the recognition results for a "dog" stored in step S209 (for example, see the above Grabner document).

An example of the additional learning processing will be described below.

First, the additional learning unit 90 updates weak discriminators. The weak discriminators here determine whether or not the image pattern is the recognition target object based on the feature amount of each local area in the processing area. Updating the weak discriminators means that the additional learning unit 90 updates the probability distribution Pr(fk|I+) of the feature amounts fk of the recognition target object by using feature amounts of local areas in the processing area that is the recognition target object. The additional learning unit 90 also updates the probability distribution Pr(fk|I−) of the feature amounts fk of the non recognition target objects by using feature amounts of local areas in the processing area that is not the recognition target object. As the feature amounts of the local area in the processing area that is the recognition target object, the additional learning unit 90 uses the feature amounts of the local areas in the processing area determined as the object and stored in step S209. As the feature amounts of the local areas in the processing area that is not the recognition target object, the additional learning unit 90 uses feature amounts of local areas in processing areas determined as not the object around the processing area determined as the object.

The additional learning unit 90 extracts a weak discriminator having the best discrimination performance based on the updated weak discriminators. The additional learning unit 90 further updates a weight for each processing area using the feature amounts and repeats updating the weak discriminators and extracting a weak discriminator for a predetermined number of times. The additional learning unit 90 updates the extracted weak discriminators as the object dictionary by combining the weak discriminators depending on the discrimination performance.

Although the Grabner document describes performing the additional learning for each added sample, the additional learning unit 90 may simultaneously add a plurality of processing areas as learning samples and perform the learning.

The result of the additional learning in this processing is reflected in the processing parameters in the second dictionary storage unit 110. That is, the additional learning unit 90 causes the number of extracted weak discriminators to be reflected as the number of local areas, and causes each weak discriminator to be reflected as the local area position, the feature amount type, and the likelihood tables. The additional learning unit 90 also updates the likelihood threshold to an appropriate value.

If the recognition results are stored in the recognition result storage unit 65 in step S209, the recognition result output unit 60 serving as an example of an output unit outputs the recognition results stored in the recognition result storage unit 65 (step S212). For example, areas representing the object in the input image corresponding to the positional coordinates of the processing areas stored in the recognition result storage unit 65 are output to the output device 4 along with the input image.

The recognition result output unit 60 determines whether or not there are more images to be subjected to the recognition processing, that is, whether to terminate the process (step S213). If there are more images to be subjected to the recognition processing, the recognition result output unit 60 moves the process to step S201. If there are no more images to be subjected to the recognition processing, the recognition result output unit 60 terminates the processing.

That is, the above-described processing in steps S201 to S212 is repeated while images are sequentially acquired by the image input unit 10 until the termination of the recognition processing. If the recognition and the additional learning are continuously performed, the additional learning is performed in step S211 and the processing in steps S202 to S212 is performed by using the processing parameters reflected in the second dictionary storage unit 110. As the additional learning is repeated, the object dictionary is customized to be an object dictionary capable of highly accurate recognition.

Thus, as described above, in the embodiment, the optimal object dictionary data item is selected from a plurality of object dictionary data items in registering the recognition target. Based on the selected object dictionary data item, additional learning for the recognition target is performed.

Therefore, highly accurate recognition is possible without specifying processing areas and feature amounts in an image in advance. For example, when recognition and learning of a "dog" is performed, an object dictionary with the highest likelihood is selected as a recognition result. Therefore, an object dictionary of "dog" that originally provides high recognition performance for recognizing a "dog" can be selected from a plurality of object dictionaries, and the additional learning can be performed. The additional learning allows improving the recognition accuracy for a particular "dog" used in the registration.

The embodiment has been described on the assumption that, in the additional learning for a "dog," the dictionary of "dog" is provided as an object dictionary provided in advance. However, the object dictionary of "dog" does not necessarily need to be provided. For example, an object dictionary such as "pets (dogs, cats)" for recognizing four-footed mammals available as pets including dogs and cats may be provided instead. In this case, the object dictionary of "pets (dogs, cats)" is selected as an object dictionary with the highest likelihood and can be customized to be an object dictionary of "dog" through the additional learning.

Even if an object dictionary corresponding to the recognition target cannot be selected in registering the recognition target (e.g., if a dictionary of "cat" is selected instead of a dictionary of "dog" in registering a "dog"), an object dictionary with the highest likelihood for the registered recognition target is selected. Therefore, according to this configuration, the object dictionary can be customized through the additional learning to be an object dictionary of "dog" capable of highly accurate recognition.

Detecting faces from an image are increasingly put into practical use with known techniques. For example, see Rowley et al, "Neural network-based face detection," IEEE TRANSACTIONS ON PATTERN ANALYSIS AND MACHINE INTELLIGENCE, VOL. 20, NO. 1, JANUARY 1998. There is a need for expanding trackable objects to objects such as pet animals rather than limiting the subjects of shooting to human faces. Realizing recognition of such various objects requires individual recognition processing for each object, and it is necessary to solve the problem of a significant increase in system resources including processing circuits and memory according to the number of categories of objects to be recognized.

To solve this problem, a recognition processing approach has been proposed that involves standardizing the processing in recognizing various objects. For example, see Yanai, "The Current State and Future Directions on Generic Object Recognition," Transactions of Information Processing Society of Japan, Vol. 48, No. SIG 16 (CVIM 19), 2007. 11. 15. With such a recognition approach, various objects can be recognized only by switching among dictionaries depending on an object desired to be recognized.

However, still in the above technique, the desired recognition target varies with the user who shoots images and it is difficult to provide dictionaries corresponding to all objects in advance.

To solve this problem, the embodiment employs the online learning.

According to the above-described configuration of the embodiment, the optimal object dictionary for recognizing an object is selected from a plurality of object dictionaries and the online learning is performed. Therefore, various objects can be recognized with high accuracy by adapting the object dictionary used for the recognition processing to recognition targets through the online learning.

Also, according to the above-described configuration of the embodiment, object recognition can be performed more easily and accurately.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240820, filed Oct. 19, 2009, which is hereby incorporated by reference herein in its entirety.

What is claimed is:

1. An information processing apparatus comprising:
an acquiring unit configured to acquire image data related to objects;
a selecting unit configured to (a) match first image data related to an object acquired by the acquiring unit and each of a plurality of object dictionaries stored in a storage device and (b) select an object dictionary relevant to the object related to the first image data from the plurality of object dictionaries based on a result of the matching;
a determining unit configured to (a) match second image data related to an object acquired by the acquiring unit and the object dictionary selected by the selecting unit and (b) determine the object related to the second image data based on a result of the matching; and
an updating unit configured to update the object dictionary selected by the selecting unit according to a result of the determination of the determining unit,
wherein each object dictionary stored in the storage device includes likelihood information which includes information representing a probability distribution of a feature amount determined in advance through machine learning,
wherein the determining unit computes a feature amount for the object related to the second image data based on feature amount information included in the object dictionary selected by the selecting unit, computes a likelihood of the object related to the second image data as the result of the matching based on the computed feature amount and the likelihood information included in the object dictionary selected by the selecting unit, and determines whether or not the object related to the second image data is the object related to the first image data based on the computed likelihood, and
wherein, if the determining unit determines that the object related to the second image data is the object related to the first image data, the updating unit updates the information representing the probability distribution of the feature amount included in the object dictionary selected by the selecting unit based on the computed feature amount.

2. The information processing apparatus according to claim 1, wherein the selecting unit computes a likelihood of the object related to the first image data for each object dictionary stored in the storage device as the result of the matching based on likelihood information included in each object dictionary, and selects an object dictionary data item corresponding to the highest one of the computed likelihoods as the object dictionary relevant to the object related to the first image data.

3. The information processing apparatus according to claim 1, wherein the determining unit computes a likelihood of the object related to the second image data as the result of the matching based on likelihood information included in the object dictionary selected by the selecting unit, and determines the object related to the second image data based on the computed likelihood.

4. The information processing apparatus according to claim 1, further comprising an output unit configured to output an area representing the object related to the second image data along with an image of the second image data to an output device if the determining unit determines that the object related to the second image data is the object related to the first image data.

5. An information processing method comprising:
acquiring image data related to objects;
matching first image data related to an object acquired in the acquiring and each of a plurality of object dictionaries stored in a storage device, and selecting an object dictionary relevant to the object related to the first image data from the plurality of object dictionaries based on a result of the matching;
matching second image data related to an object acquired in the acquiring and the object dictionary selected in the selecting, and determining the object related to the second image data based on a result of the matching; and updating the object dictionary selected in the selecting according to a result of the determination in the determining, wherein each object dictionary stored in the storage device includes likelihood information which includes information representing a probability distribution of a feature amount determined in advance through machine learning, wherein the determining (a) computes a feature amount for the object related to the second image data based on feature amount information included in the object dictionary selected by the selecting, (b) computes a likelihood of the object related to the second image data as the result of the matching based on the computed feature amount and the likelihood information included in the object dictionary selected by the selecting, and (c) determines whether or not the object related to the second image data is the object related to the first image data based on the computed likelihood, and wherein, if the determining determines that the object related to the second image data is the object related to the first image data, the updating updates the information representing the probability distribution of the feature amount included in the object dictionary selected by the selecting based on the computed feature amount.

6. A non-transitory computer-readable storage medium for storing a program that causes a computer to execute the information processing method according to claim 5.

* * * * *